United States Patent
Clemm et al.

(10) Patent No.: US 9,489,279 B2
(45) Date of Patent: Nov. 8, 2016

(54) VISUALIZATION OF PERFORMANCE DATA OVER A NETWORK PATH

(75) Inventors: Alexander Clemm, Los Gatos, CA (US); Eric Dorman, Newark, CA (US); Steve Chen-Lin Chang, Cupertino, CA (US); Gaurang Mokashi, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1418 days.

(21) Appl. No.: 13/008,840

(22) Filed: Jan. 18, 2011

(65) Prior Publication Data
US 2012/0185775 A1 Jul. 19, 2012

(51) Int. Cl.
*G06F 11/30* (2006.01)
*H04L 12/26* (2006.01)
(Continued)

(52) U.S. Cl.
CPC .......... *G06F 11/3006* (2013.01); *G06F 11/30* (2013.01); *G06F 11/323* (2013.01); *G06F 11/3409* (2013.01); *G06F 11/3466* (2013.01); *H04L 41/22* (2013.01); *H04L 43/045* (2013.01); *H04L 43/08* (2013.01); *G06F 11/302* (2013.01); *G06F 11/3452* (2013.01); *G06F 17/30554* (2013.01); *G06F 17/30572* (2013.01); *G06F 2201/865* (2013.01); *G06T 11/206* (2013.01); *H04L 41/12* (2013.01); *H04L 43/0817* (2013.01); *H04L 43/0829* (2013.01);
(Continued)

(58) Field of Classification Search
CPC ..... G06T 11/206; H04L 41/22; H04L 41/12; H04L 43/08; H04L 43/045; H04L 43/10; H04L 43/14; H04L 43/0817; H04L 43/0829; G06F 17/30554; G06F 17/30958; G06F 11/323; G06F 11/3466; G06F 17/30994; G06F 2201/865; G06F 11/079; G06F 11/3409; G06F 19/12; G06F 19/3406; G06F 11/30; G06F 11/3006; G06F 11/302; G06F 11/3452; G06F 17/30572; G06F 17/30696; G06Q 10/0637; G06Q 10/0639
See application file for complete search history.

(56) References Cited

U.S. PATENT DOCUMENTS 5,581,677 A * 12/1996 Myers et al. .................. 345/440
5,596,703 A * 1/1997 Eick et al. ..................... 715/700
(Continued)

OTHER PUBLICATIONS

Yoshimura, Takeshi, et al. "Rate and robustness control with RTP monitoring agent for mobile multimedia streaming." Communications, 2002. ICC 2002. IEEE International Conference on. vol. 4. IEEE, 2002.*

*Primary Examiner* — Eric Wiener
(74) *Attorney, Agent, or Firm* — Patterson + Sheridan, LLP

(57) ABSTRACT

A system and technique for visualizing performance data over a network path are disclosed. More specifically, a network management system generates and displays an object that represents data for one or more performance characteristics related to a plurality of network nodes in the network path. In one embodiment, a graph having an x-axis and a y-axis is displayed, the x-axis being associated with two or more network nodes in the network path and the y-axis being associated with a first performance characteristic. Data corresponding to the first performance characteristic is plotted as data points corresponding to the network nodes associated with the x-axis. Data corresponding to a second performance characteristic may be represented via the size or the color of the data points. Alternatively, a characterization of the data corresponding to the first performance characteristic may be represented by the size or color of the data points.

17 Claims, 5 Drawing Sheets

(51) Int. Cl.
*G06F 11/32* (2006.01)
*G06F 11/34* (2006.01)
*G06T 11/20* (2006.01)
*H04L 12/24* (2006.01)
*G06F 17/30* (2006.01)

(52) U.S. Cl.
CPC .......... *H04L 43/0835* (2013.01); *H04L 43/10* (2013.01); *H04L 43/14* (2013.01); *H04L 43/16* (2013.01)

(56) References Cited

U.S. PATENT DOCUMENTS

| | | | |
|---|---|---|---|
| 5,845,277 A * | 12/1998 | Pfeil et al. | |
| 5,917,500 A * | 6/1999 | Johnson et al. | 345/440 |
| 5,966,127 A * | 10/1999 | Yajima | 715/764 |
| 5,966,139 A * | 10/1999 | Anupam et al. | 345/440 |
| 6,219,050 B1 * | 4/2001 | Schaffer | 715/853 |
| 6,356,256 B1 * | 3/2002 | Leftwich | 345/157 |
| 6,373,488 B1 * | 4/2002 | Gasper et al. | 345/440 |
| 6,404,437 B1 * | 6/2002 | Russell et al. | 345/473 |
| 6,429,868 B1 * | 8/2002 | Dehner et al. | 345/440 |
| 6,654,803 B1 * | 11/2003 | Rochford et al. | 709/224 |
| 6,671,680 B1 * | 12/2003 | Iwamoto et al. | 707/737 |
| 6,950,786 B1 * | 9/2005 | Sonneland et al. | 703/2 |
| 7,181,373 B2 * | 2/2007 | Le Cocq et al. | 703/1 |
| 7,212,208 B2 * | 5/2007 | Khozai | 345/440 |
| 7,714,862 B1 * | 5/2010 | Dwyer et al. | 345/440 |
| 7,729,875 B2 * | 6/2010 | Iwamura et al. | 702/94 |
| 8,274,905 B2 * | 9/2012 | Edwards et al. | 370/252 |
| 9,015,716 B2 * | 4/2015 | Fletcher et al. | 718/1 |
| 2002/0080181 A1 * | 6/2002 | Razdow et al. | 345/772 |
| 2002/0116154 A1 * | 8/2002 | Nowak | H04L 12/2697 702/186 |
| 2003/0011601 A1 * | 1/2003 | Itoh et al. | 345/440 |
| 2004/0150644 A1 * | 8/2004 | Kincaid et al. | 345/440 |
| 2006/0106847 A1 * | 5/2006 | Eckardt et al. | 707/101 |
| 2006/0253356 A1 * | 11/2006 | Charles et al. | 705/35 |
| 2007/0022000 A1 * | 1/2007 | Bodart et al. | 705/10 |
| 2007/0147685 A1 * | 6/2007 | Ericson | 382/225 |
| 2007/0211056 A1 * | 9/2007 | Chakraborty et al. | 345/440 |
| 2007/0244783 A1 * | 10/2007 | Wright et al. | 705/35 |
| 2008/0049641 A1 * | 2/2008 | Edwards | H04L 12/66 370/253 |
| 2008/0092121 A1 * | 4/2008 | DeRose et al. | 717/125 |
| 2008/0320075 A1 * | 12/2008 | Livshits et al. | 709/203 |
| 2009/0157630 A1 * | 6/2009 | Yuan | 707/3 |
| 2009/0235152 A1 * | 9/2009 | Rampson et al. | 715/207 |
| 2010/0031165 A1 * | 2/2010 | Lindquist | 715/757 |
| 2010/0204973 A1 * | 8/2010 | Parkinson et al. | 703/11 |
| 2010/0287478 A1 * | 11/2010 | Avasarala et al. | 715/737 |
| 2011/0098540 A1 * | 4/2011 | Tanishima et al. | 600/300 |
| 2011/0169819 A1 * | 7/2011 | Ian | 345/419 |
| 2011/0252327 A1 * | 10/2011 | Awasthi et al. | 715/736 |
| 2011/0261049 A1 * | 10/2011 | Cardno et al. | 345/419 |
| 2012/0110460 A1 * | 5/2012 | Wilson | 715/736 |
| 2012/0151419 A1 * | 6/2012 | Kent et al. | 715/854 |
| 2012/0159298 A1 * | 6/2012 | Fisher et al. | 715/215 |
| 2012/0166250 A1 * | 6/2012 | Ferrante et al. | 705/7.29 |

* cited by examiner

VISUALIZATION OF PERFORMANCE DATA OVER A NETWORK PATH

BACKGROUND OF THE INVENTION

1. Field of the Invention

The invention relates generally to the field of network management and, more specifically, to visualization of performance data over a network path.

2. Description of the Related Art

Traditional network management systems allow a network administrator to troubleshoot network problems using a graphical user interface (GUI). In some instances, the GUIs may include such features as a topology view of the network, a view of a network path taken by a particular service, and a view of network statistics for a particular node in the network. The topology view of the network may include a layout of all nodes and the particular IP address for each particular node. The view of a network path taken by packets associated with a particular service may be displayed by highlighting each node in the network path in the topology view. Finally, the view of network statistics for a particular node may be displayed when a network administrator zooms in on a particular node in the topology view by selecting that node.

Utilizing such network management systems, the network administrator may check network statistics for each node individually in order to troubleshoot any issues with the network. The GUI may display network statistics, such as a CPU utilization rate, memory utilization rate and link utilization rate, for a particular node in a single view.

One drawback to the approach of troubleshooting network problems using traditional network management systems is that network administrators typically need to compare network statistics for a plurality of nodes in order to isolate faults in the network and determine the root cause of the issue. Typically, values for a single network statistic are displayed in a view of the network management system, making it difficult for the network administrator to correlate a symptom with the root cause (e.g., high packet drop rate is the result of high CPU utilization). Using traditional network management systems, network administrators are required to navigate between different views within the GUI to compare network statistics between two or more nodes. Jumping back and forth between different views may lead to inefficiency and longer delays before the network administrator is able to fix the particular issue.

As the foregoing illustrates, what is needed in the art is an improved approach for visualizing performance data for multiple nodes of a network path in a common view.

BRIEF DESCRIPTION OF THE FIGURES

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of any of the example embodiments may be incorporated in other embodiments without further recitation.

DESCRIPTION OF EXAMPLE EMBODIMENTS

In the following description, numerous specific details are set forth to provide a more thorough understanding of various embodiments of the invention. However, it will be apparent to one of skill in the art that certain embodiments of the invention may be practiced without one or more of these specific details. In other instances, well-known features have not been described in order to avoid obscuring the invention.

Overview

One embodiment of the present invention sets forth a method for visualizing performance characteristic over a network path. The method steps include receiving data associated with one or more performance characteristics related to a plurality of network nodes in a network path and generating an object within a graphical user interface (GUI) to display data associated with a first performance characteristic via a first type of representation within the object and either data associated with a second performance characteristic or a characterization of the data associated with the first performance characteristic via a second type of representation within the object.

DETAILED DESCRIPTION OF THE FIGURES

Figure 1:
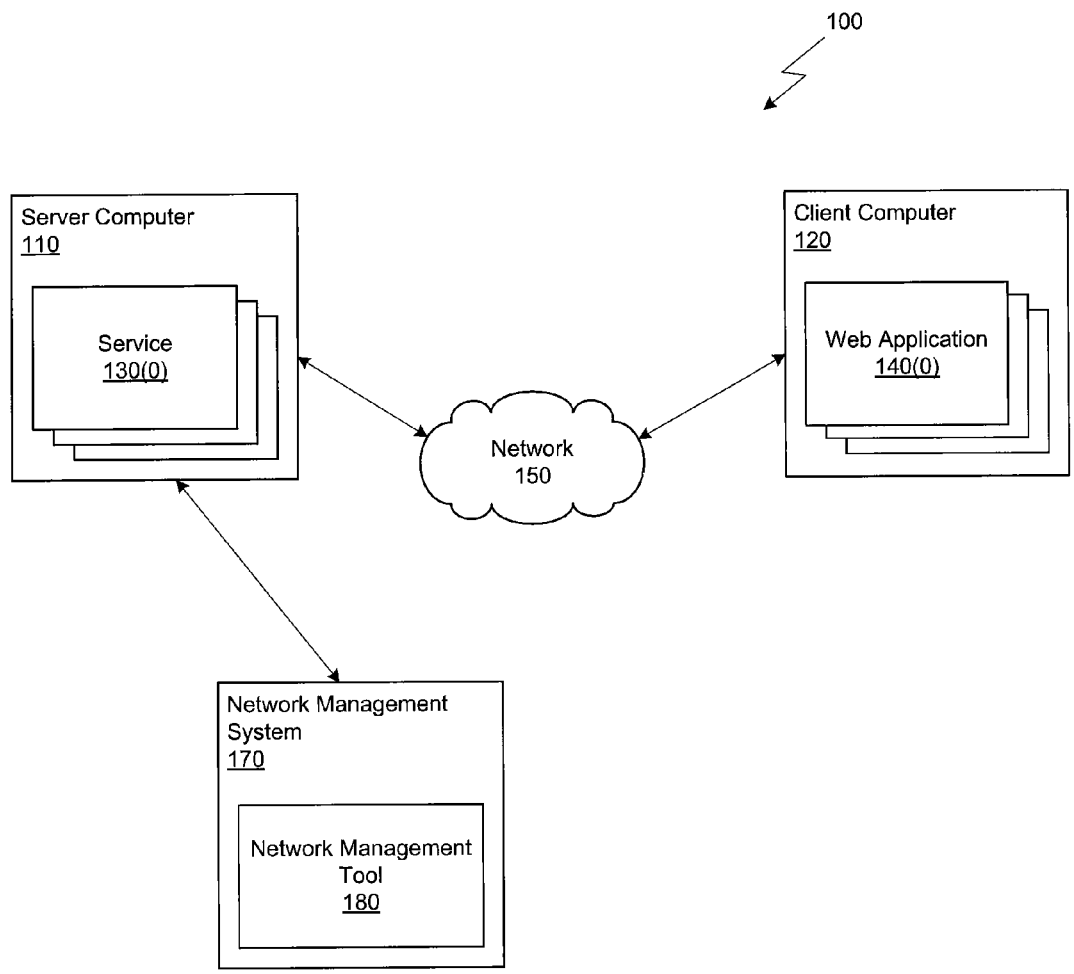
FIG. 1 illustrates a computer network monitored by a network management system, according to one example embodiment of the invention.

FIG. 1 illustrates a computer network 100 monitored by a network management system 170, according to one example embodiment of the invention. As shown, computer network 100 includes a server computer 110, a client computer 120, a network management system 170, and a network 150. Network 150 may be a local area network (LAN), a wide area network (WAN), or the Internet. Alternatively, network 150 may be a combination of multiple networks, such as a LAN with an interface connected to the Internet. Server computer 110 includes one or more services 130 such as a media streaming service, and client computer 120 includes one or more web applications 140 that may be configured to call services 130. Server computer 110 and client computer 120 transmit communications via an interface to network 150.

Network management system 170 may be a computer running a network management tool 180 configured to visualize performance characteristic data for a plurality of network nodes of computer network 100. For example, network management tool 180 may be configured to display performance characteristic data for all network nodes included in a network path. A network path may include all nodes in network 150 traversed by a particular network flow, such as streaming media packets transmitted between services 130 and web applications 140, as well as server computer 110 and client computer 120. In one embodiment, network management system 170 may be connected directly to server computer 110. In other embodiments, network management system 170 may be connected to network 150. It will be appreciated by one of ordinary skill in the art that one or more of server computer 110, client computer 120 and network management system 170 may be included in network 150.

Network traffic for services 130 flows between server computer 110 and client computer 120 over a plurality of network nodes in network 150. As issues arise with the network 150, users of web applications 140 may experience interruptions. For example, certain network nodes in network 150 may experience high loads of network traffic that cause delays in delivery of data packets between services 130 and web applications 140. For bandwidth critical services such as media streaming or voice over IP (VOIP), these delays can cause the resulting application to fail or cause the service level and performance of the application to degrade. Thus, a network administrator may need to diagnose which network nodes in the network path are causing the problem in order to correct the issue.

Figure 2:
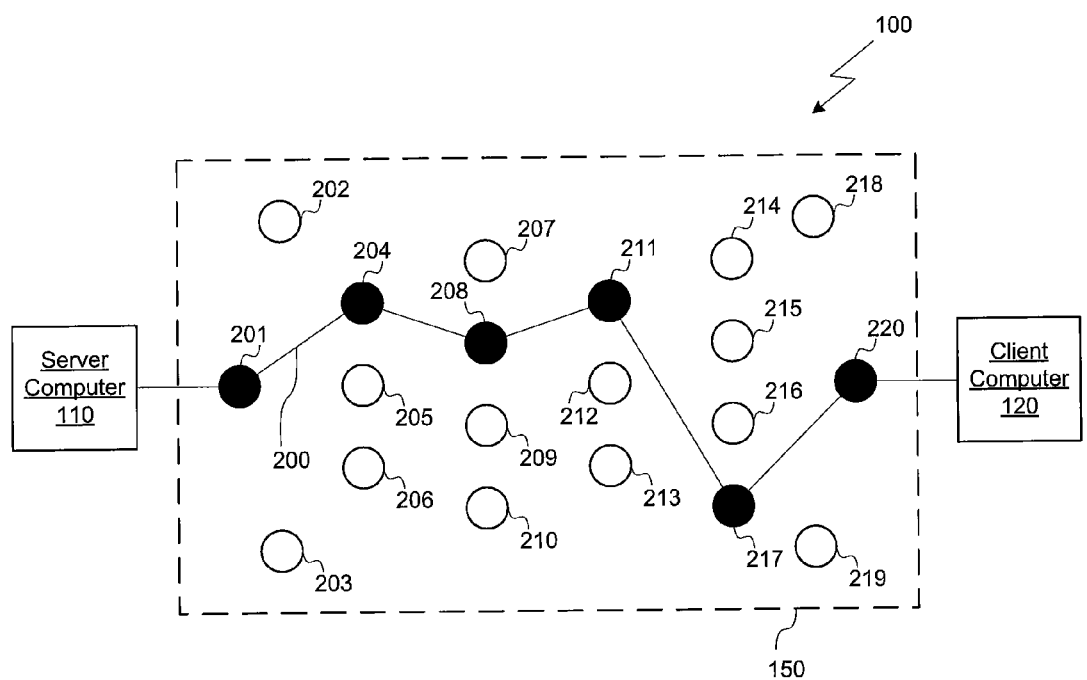
FIG. 2 illustrates a network path in the computer network of FIG. 1, according to one example embodiment of the present invention.

FIG. 2 illustrates a network path 200 in the computer network 100 of FIG. 1 according to one example embodiment of the present invention. As shown, network 150 includes network nodes 201 through 220. Each of the network nodes 201-220 may be a different network device such as a modem, a bridge, a switch, a VOIP handset, a computer or other networking device connected to network 150. For example, network node 201 may be a switch while network node 205 may be a computer connected to network 150. Each network node in network 150 is associated with a unique MAC address. In one embodiment, network 150 is the Internet and each network node may be identified by a unique IP address.

Network path 200 is the path through the network 150 for packets associated with a particular data stream sent from services 130 to web applications 140. As shown, network path 200 begins at server computer 110 and ends at client computer 120. Server computer 110 formats data packets for transmission over network 150 and transmits the data packets using a physical layer device such as a NIC. Data packets in network path 200 are forwarded to client computer 120 by network nodes 201, 204, 208, 211, 217 and 220.

In order for a network administrator to troubleshoot issues with computer network 100, network management tool 180 may enable the network administrator to visualize various performance characteristics for the network nodes in network path 200. For example, network management tool 180 may plot the values for a particular performance characteristic on an X-Y graph for each node in network path 200. The x-axis may be configured to represent network path 200, and the y-axis may be configured to represent the value for the particular performance characteristic for each network node in network path 200. In order to facilitate troubleshooting of computer network 100, network management system 170 is configured to collect performance characteristic data from each of the network nodes in network path 200 and display one or more of the performance characteristics for each of the network nodes in a single view on the display.

In one embodiment, network management tool 180 may be configured to cause server computer 110 to collect a plurality of performance characteristics for each of the network nodes in network path 200 by sending a network control message to client computer 120. Server computer 110 may be configured to format the network control message using one or more network management protocols such as the resource reservation protocol (RSVP) or other network management protocol configured to collect performance characteristic data from each of the network nodes. Server computer 110 may send an RSVP message configured to collect data for the performance characteristics of each node along network path 200. Such data may include information about each network node's CPU utilization rate, memory utilization rate, or number of dropped data packets, among other performance characteristics. Such information may pertain to a network node as a whole or to a particular interface included within a network node, such as dropped data packets at an ingress or egress interface for the network node. As the RSVP message is received at each network node along network path 200, the network node may be configured to read the message and append any requested performance characteristic data to the payload of the message before forwarding the RSVP message to the client computer 120. When the RSVP message is received by the client computer 120, the client computer transmits the RSVP message, including the appended performance characteristic data, back to server computer 110 along network path 200. In some embodiments, server computer 110 and client computer 120 may be configured to append requested performance characteristic data to the RSVP message as well. Thus, the collected performance characteristics may include data associated with each of the network nodes in network path 200 as well as the server computer 110 and client computer 120.

In one embodiment, each network node of network path 200 is configured to monitor the performance characteristics of that particular network node. The network nodes of network 150 may implement an application layer that continuously monitors various performance characteristics of the network node, such as CPU utilization rate, memory utilization rate, or number of dropped data packets. When the network node receives a network control message requesting performance characteristic data, the application layer is configured to append the requested data to the network control message before forwarding the message to the destination address.

In other embodiments, some network nodes in network 150 may not be configured to monitor their performance characteristics. In such embodiments, when a network control message is received by the network node, the network node simply forwards the message to the destination node without appending any performance characteristic data. However, the network node may update an IP TTL (time to live) counter in the network control message thereby indicating that the network control message traversed through a node. Thus, the server computer 110 receives the returned network control message containing performance characteristic data for the network nodes in network path 200 configured to monitor their performance characteristics and a count of the total number of nodes included in the network path.

It will be appreciated by one of ordinary skill in the art that network management tool 180 may discover network path 200 and collect performance characteristic data of the various network nodes in network path 200 in a variety of ways. For example, network management tool 180 may cause server computer 110 to execute software, such as ICMP traceroute, to discover an IP address for each of the plurality of network nodes in network path 200. Then, network management tool 180 may send separate request messages to each network node in network path 200 to collect performance characteristic data from each of the network nodes individually. Any technically feasible method of collecting performance characteristic data from each of the network nodes in network path 200 is within the scope of the present invention. For example, collecting performance characteristic data could be performed using a simple network management protocol (SNMP), XML messages, or analyzing the flow of data in network 150.

Figure 3:
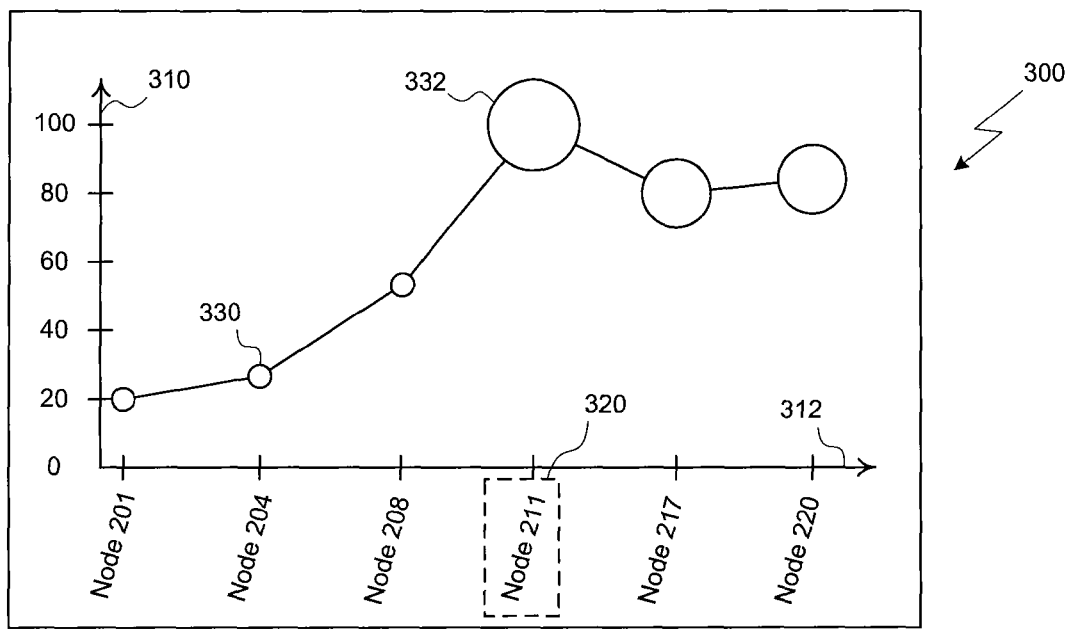
FIG. 3 illustrates a GUI object generated by a network management tool, according to one example embodiment of the present invention.

FIG. 3 illustrates a GUI object 300 generated by a network management tool 180, according to one example embodiment of the present invention. As shown, GUI object 300 is a graph that represents the values of one or more performance characteristics associated with each of the network nodes in network path 200. The x-axis 312 is associated with the network nodes of network path 200, and the y-axis 310 is associated with at least one performance characteristic. In one embodiment, the x-axis 312 includes network node labels 320 that identify the particular network node associated with the data point located above that position on the x-axis. In one embodiment, the network node may be identified by displaying a network node ID, a hop number, or an IP address associated with that particular network node. In another embodiment, any other type of label, such as an icon, may be used to identify each of the network nodes in network path 200.

In one embodiment, a first set of data related to a first performance characteristic is displayed in GUI object 300. The first set of data may correspond to any single performance characteristic collected for each of the network nodes in network path 200. For example, network management tool 180 may collect performance characteristic data for CPU utilization rate from each of the network nodes, and a data point associated with each network node is plotted against the y-axis 310. The location of data point 330 on the y-axis 310 represents the CPU utilization rate of network node 204, shown in FIG. 3 as approximately 25%. In contrast, the location of data point 332 indicates that network node 211 has a CPU utilization rate of approximately 100%.

Advantageously, GUI object 300 may present a second set of data to a network administrator in the same view. In one embodiment, the second set of data corresponds to a characterization of the first set of data according to one or more predetermined threshold values. The size of the data points associated with each network node may be adjusted to indicate the characterization of the value of the performance characteristic for each network node. For example, network management tool 180 may be configured to increase the size of the data point for any network nodes that return a value above a critical threshold. The size of the data point may indicate to the network administrator that a network node is experiencing a critical issue. As shown in FIG. 3, network node 211 has a CPU utilization rate of 100%, and the size of data point 332 is larger to draw the network administrator's attention to network node 211 as the possible cause of the issue. In another embodiment, a plurality of threshold levels may be compared to the first set of data and a plurality of different sized data points may correspond to the plurality of threshold levels.

Figure 4:
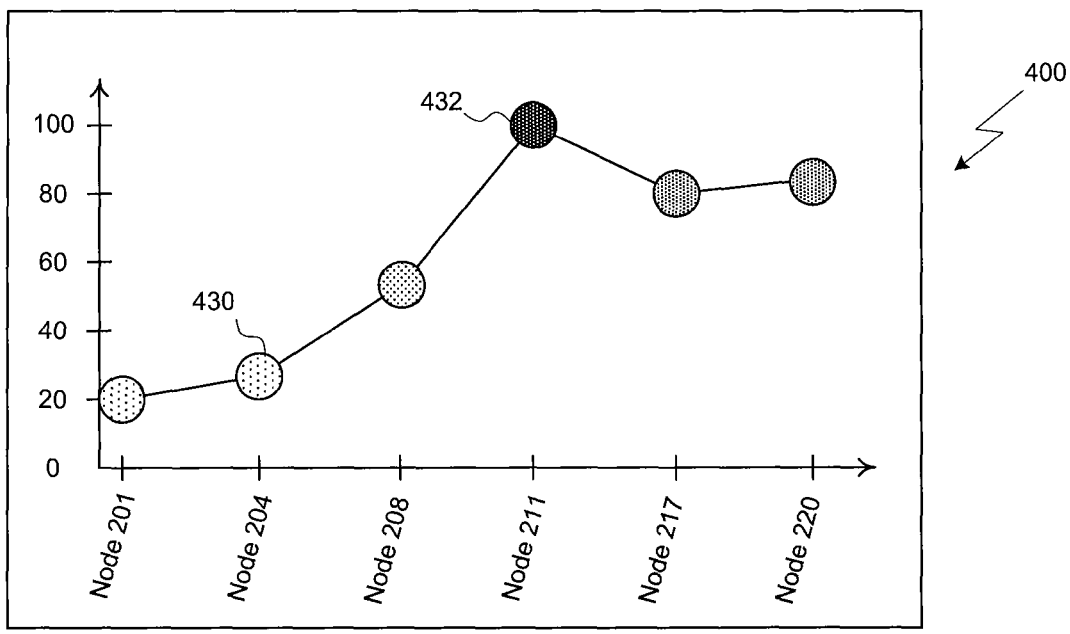
FIG. 4 illustrates a GUI object generated by a network management tool, according to another example embodiment of the present invention.

FIG. 4 illustrates a GUI object 400 generated by a network management tool 180, according to another example embodiment of the present invention. GUI object 400 is similar to GUI object 300 except that the colors of the data points are changed to correspond to a characterization of the first set of data. As shown, data point 410 is a first color, such as green, and data point 412 is a second color, such as red. Network management tool 180 may be configured to display a data point in the first color when the value of the performance characteristic received from the network node is below a critical threshold, indicating that the network node is operating normally. In contrast, network management tool 180 may also be configured to display a data point in a second color when the value of the performance characteristic received from the network node is above a critical threshold, indicating that the network node is operating in a critical state. It will be apparent to one of ordinary skill in the art that more than two colors may be used to indicate varying levels of operation. For example, a third color such as yellow may indicate that the network node is operating just below the critical threshold.

In one embodiment, multiple colors could also be used concurrently, for instance to indicate values for more than two sets of performance characteristics. For example, the colors of the data points could be animated to "cycle through" different colors, each color associated with a different performance characteristic and the intensity of the color corresponding to the value associated with that performance characteristic for a particular network node. In alternative embodiments, the data points for the network node may be divided into multiple parts, where each part corresponds to a different performance characteristic. For example, data points could have a left half associated with the color green and a right half associated with the color blue, with the intensity of the two colors corresponding to the values associated with a particular performance characteristic for that particular network node.

It will be appreciated by one of ordinary skill in the art that different performance characteristics may be represented by changing the data points associated with the network nodes in other ways as well. In one embodiment, the shape of the data points may be changed to reflect the values related to a particular performance characteristic. For example, a circular data point may be used to indicate network nodes operating within a normal range for a particular performance characteristic while a square data point may be used to indicate network nodes operating within a critical range for a particular performance characteristic.

Figure 5:
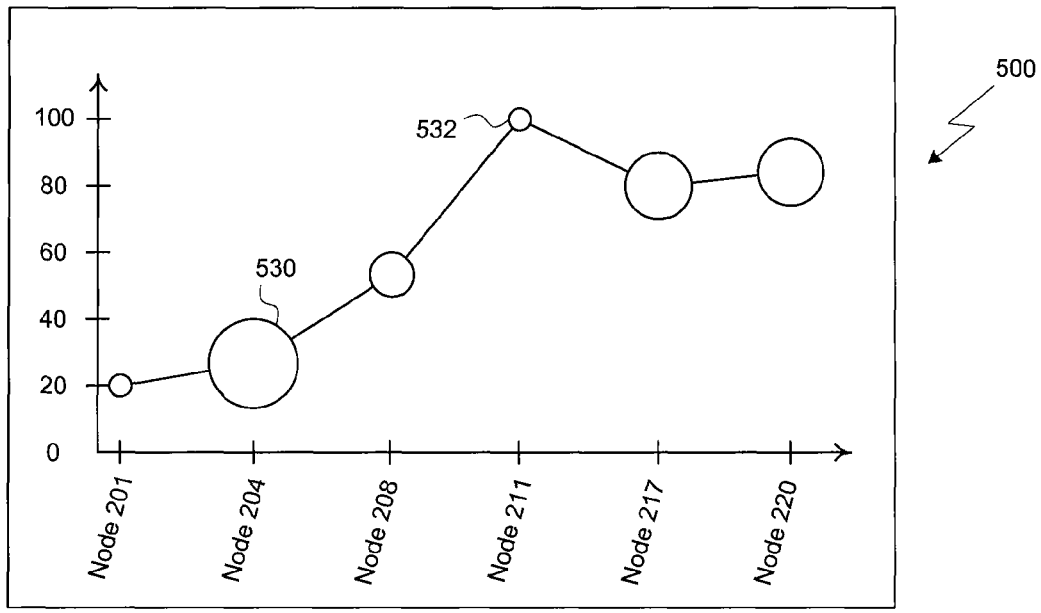
FIG. 5 illustrates a GUI object generated by a network management tool, according to yet another example embodiment of the present invention.

FIG. 5 illustrates a GUI object 500 generated by a network management tool 180, according to yet another example embodiment of the present invention. Unlike GUI objects 300 or 400, GUI object 500 displays two sets of performance characteristic data simultaneously in the same view. As shown, the location of each data point in GUI object 500 in relation to the y-axis 310 indicates the value corresponding to a particular network node for a first performance characteristic. In addition, the size of each data point in GUI object 500 indicates the value corresponding to a particular network node for a second performance characteristic. The size of the data points may be unrelated to the first set of data and, therefore, enables the network administrator to visualize more information in the same view of the display.

In one embodiment, the first set of data may be associated with the CPU utilization rate for each of the network nodes in network path 200, and the second set of data may be associated with a measure of the number of dropped packets for each of the network nodes. For example, data point 530 corresponds to network node 204. The location of data point 530 in relation to the y-axis 310 indicates that the CPU utilization rate of network node 204 is approximately 25%. A CPU utilization rate of 25% may be a normal operating state of the network node, however, the size of data point 530 is relatively large to indicate that a large number of packets received by network node 204 are being dropped by network node 204. In comparison, data point 532 indicates that the CPU utilization rate of network node 211 is approximately 100%, but only a small number of packets received by network node 211 are being dropped by network node 211.

As shown by FIG. 5, the network administrator can easily compare multiple sets of performance characteristic data for each of the network nodes in network path 200 simultaneously in the same view displayed by network management system 170. More than two sets of performance characteristic data may be displayed in GUI object 500 by displaying the data points via another type of representation, such as by including different colored data points as well as different sized data points. In addition, a second set of data points may be plotted on the same graph to display more information simultaneously, where the second set of data points have a different color (or a different shape or other distinguishing characteristic) than the first set of data points to differentiate the data points of the first set from the second set. This may be advantageous for displaying performance characteristics associated with ingress and egress interfaces concurrently (e.g., one set of data points may be associated with ingress interface packet drop rate and CPU utilization, while a second set of data points may be associated with egress interface packet drop rate and CPU utilization). Furthermore, two or more GUI objects 500 may be displayed on the same view in order to show multiple sets of performance characteristics. For example, one view of the display may show four graphs associated with data related to four distinct performance characteristics and the characterization of that data.

Figure 6:
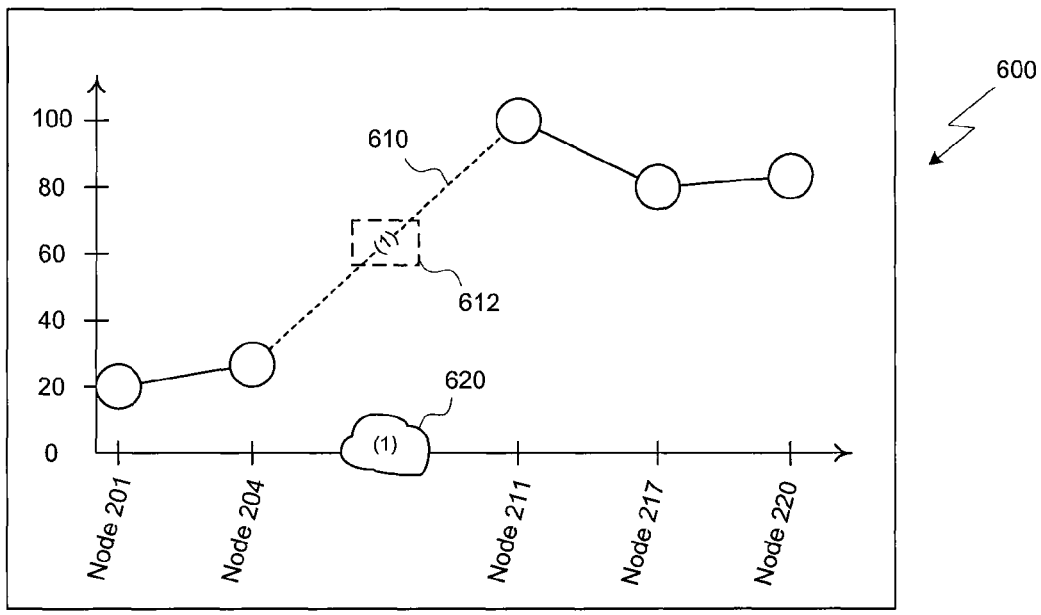
FIG. 6 illustrates a GUI object generated by a network management tool, according to still another example embodiment of the present invention.

FIG. 6 illustrates a GUI object 600 generated by a network management tool 180, according to still another example embodiment of the present invention. In computer network 100, some network nodes may not be configured to monitor the performance characteristics requested by network management tool 180. For example, a switch may not include an application layer that continuously collects performance characteristic data, or the switch may not implement a transport layer configured to process RSVP packets. Such network nodes may be configured to merely forward the network control message to the next network node in network path 200. Thus, network management tool 180 is not able to collect data for the performance characteristic for every network node in network path 200.

In one embodiment, GUI object 600 may be configured to indicate that one or more network nodes are not included in the graph displayed by network management system 170. The line drawn between two data points may be dashed to indicate that one or more network nodes between the two network nodes associated with the data points connected by the line failed to return the requested performance characteristic data. As shown, the line 610 drawn between the data points associated with network node 204 and network node 211 is dashed to indicate that node 208 is not configured to monitor performance characteristics of the network node. In alternative embodiments, the line may be grayed out or an icon such as a cloud may be superimposed over the line to indicate that one or more network nodes failed to return the requested performance characteristic data.

Line 610 may also include a label 612 that indicates the number of network nodes that are not configured to monitor performance characteristics between network node 204 and network node 211. In this case, label 612 shows a value of one to indicate that network node 208 is the only network node that was not configured to monitor performance characteristics. In other cases, label 612 may show a value of two or more to indicate the consecutive number of network nodes that are not configured to collect performance characteristic data. In alternative embodiments, line 610 may not include a label 612. In such embodiments, other methods may be used to indicate the number of intermediate network nodes that failed to return performance characteristic data, such as by varying the size of an icon superimposed over line 610.

In alternative embodiments, the presence of network nodes not configured to monitor performance characteristics may be indicated in other ways, such as by a graphical icon in GUI object 600. For example, icon 620 may be displayed on the x-axis between the labels for network node 204 and network node 211. As shown, icon 620 is a cloud with a label that indicates the number of network nodes that were not configured to monitor performance characteristics between the two network nodes on either side of icon 620.

Figure 7:
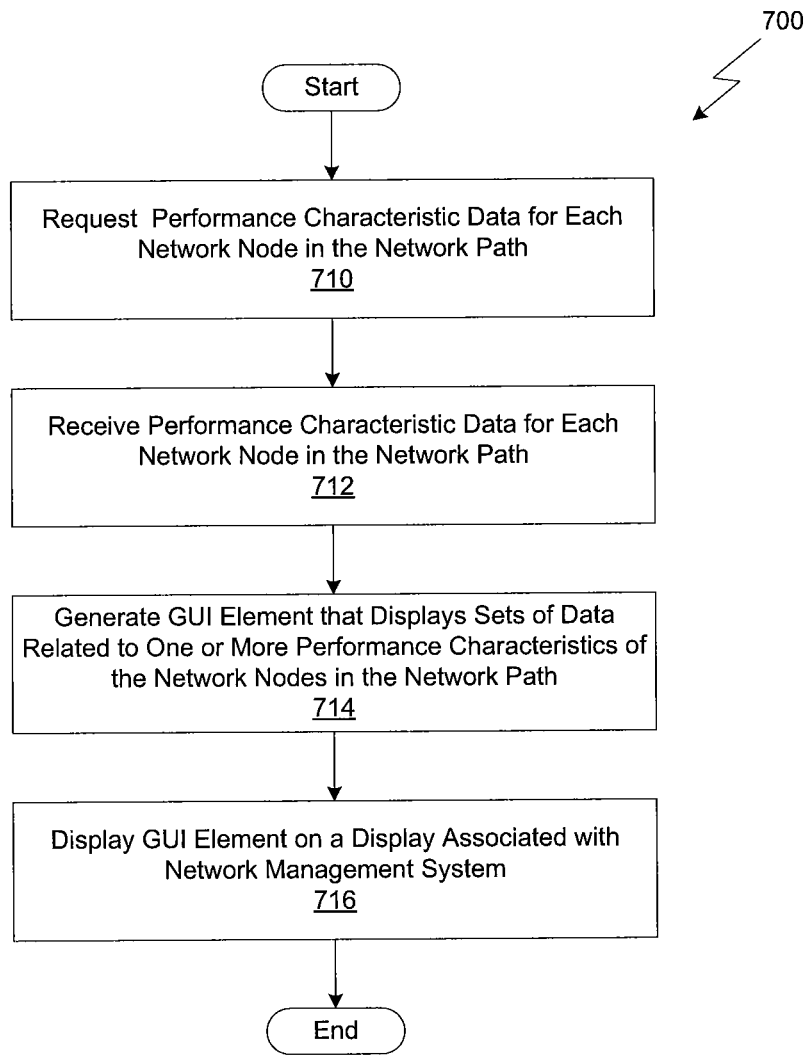
FIG. 7 is a flow diagram of method steps for displaying data for one or more performance characteristics of the network nodes in a network path, according to one example embodiment of the invention.

FIG. 7 is a flow diagram of method steps 700 for displaying data for one or more performance characteristics of the network nodes in a network path 200, according to one example embodiment of the invention. Although the method steps are described in conjunction with the systems of FIGS. 1-6, persons skilled in the art will understand that any system configured to perform the method steps, in any order, is within the scope of the present invention.

At step 710, network management tool 180 is configured to request performance characteristic data from one or more network nodes in network path 200. In one embodiment, network management tool 180 causes server computer 110 to send a network control message, such as an RSVP message, to client computer 120 to request the performance characteristic data. At step 712, network management tool 180 receives the performance characteristic data in the returned network control message. At step 714, network management tool 180 generates a GUI object 300 associated with the performance characteristic data. In one embodiment, a first set of data represents one set of values for a particular performance characteristic and the second set of data represents a characterization of the first set of data generated by network management tool 180. In another embodiment, a first set of data represents one set of values for a particular performance characteristic and a second set of data represents a second set of values for a second performance characteristic. In yet other embodiments, more than two sets of data representing values for more than two performance characteristics are displayed in GUI object 300. At step 716, network management tool 180 causes the GUI object 300 to be displayed in a display associated with network management system 170.

In sum, the technique described above allows a network administrator to visualize performance characteristics for a plurality of network nodes along a network path on a single view of the display. More specifically, a network management tool collects performance characteristic data from each of the network nodes in the network path between and including a server computer and a client computer. The network management tool then generates a GUI object, such as a graph, that displays two or more sets of data related to the performance characteristics. A first set of data is displayed via a first type of representation in the GUI object, such as a location in relation to a y-axis, and a second set of data is displayed via a second type of representation in the GUI object, such as the size or color of each data point. Additional sets of data may be displayed via additional distinguishable types of representation, such as the shape of each data point.

One advantage of the disclosed technique is that network administrators are not required to view performance characteristic data for each network node individually. In prior art systems, a network administrator may be required to select a particular node in a topology view of the network in order to view the performance characteristics for the network node. Such systems did not allow a network administrator to view the performance characteristic data for all network nodes of a network path on a single display. In addition, the technique also allows a network administrator to view a characterization of the performance data to draw the administrator's attention quickly to critical network nodes or compare multiple performance characteristics on a single view of the display. Such advantages allow a network administrator to more quickly diagnose and correct issues with the network.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method comprising:
sending a request to each of a plurality of network nodes in a network path for data associated with one or more performance characteristics, wherein at least one of the network nodes is configured to monitor the one or more performance characteristics, wherein the one or more performance characteristics include at least one of a CPU utilization rate, memory utilization rate, and number of dropped data packets;
receiving, from each of the plurality of network nodes in the network path, the requested data associated with the one or more performance characteristics; and
generating an object within a graphical user interface (GU) to:
display, via a first type of representation within the object, data associated with a respective first performance characteristic of one or more of the plurality of network nodes in the network path; and
display, via a second type of representation within the object, either data associated with a second respective performance characteristic of one or more of the plurality of network nodes in the network path or a characterization of the data associated with the respective first performance characteristic of one or more of the plurality of network nodes in the network path, the second type of representation being distinct from the first type of representation wherein:
the object comprises a graph having an x-axis, associated with at least two of the network nodes, and a y-axis, associated with the respective first performance characteristic of the at least two of the network nodes;
each of the at least two of the network nodes is represented by a distinct position on the x-axis, and
each respective first performance characteristic of each of the at least two of the network nodes is represented by a respective position on the y-axis.

2. The method of claim 1, wherein the first type of representation is a location of data points relative to the y-axis, and the second type of representation is a size of the data points.

3. The method of claim 1, wherein the first type of representation is a location of data points relative to the y-axis, and the second type of representation is a color of the data points.

4. The method of claim 1, wherein the object indicates that at least one network node in the network path is not configured to monitor performance characteristics of the at least one network node.

5. The method of claim 1, further comprising, causing a server computer to transmit a network control message to a client computer via at least two of the nodes in the network path, wherein, when receiving a network control message, each node appends data associated with at least one of the one or more performance characteristics to the network control message and forwards the network control message with the appended data to the client computer.

6. The method of claim 1, wherein the object further displays data associated with a third respective performance characteristic of one or more of the plurality of network nodes in the network path via a third type of representation within the object.

7. A non-transitory computer-readable medium including, instructions that, when executed by a processor, perform the steps of:
sending a request to each of a plurality of network nodes in a network path for data associated with one or more performance characteristics, wherein at least one of the network nodes is configured to monitor the one or more performance characteristics, wherein the one or more performance characteristics include at least one of a CPU utilization rate, memory utilization rate, and number of dropped data packets;
receiving, from each of the plurality of network nodes in the network path, the requested data associated with the one or more performance characteristics; and
generating an object within a graphical user interface (GUI) to:
display, via a first type of representation within the object, data associated with a respective first performance characteristic of one or more of the plurality of network nodes in the network path; and display via a second type of representation within the object, either data associated with a second respective performance characteristic of one or more of the plurality of network nodes in the network path or a characterization of the data associated with the respective first performance characteristic of one or more of the plurality of network nodes in the network path, the second type of representation being distinct from the first type of representation, wherein:
 the object comprises a graph having an x-axis, associated with at least two of the network nodes, and a y-axis, associated with the respective first performance characteristic of the at least two of the network nodes;
 each of the at least two of the network nodes is represented by a distinct position on the x-axis, and
 each respective first performance characteristic of each of the at least two of the network nodes is represented by a respective position on the y-axis.

8. The non-transitory computer-readable medium of claim 7, wherein the first type of representation is a location of data points relative to the y-axis, and the second type of representation is a size of the data points.

9. The non-transitory computer-readable medium of claim 7, wherein the first type of representation is a location of data points relative to the y-axis, and the second type of representation is a color of the data points.

10. The non-transitory computer-readable medium of claim 7, wherein the object indicates that at least one network node in the network path is not configured to monitor performance characteristics of the at least one network node.

11. The non-transitory computer-readable medium of claim 7, further comprising causing a server computer to transmit a network control message to a client computer via at least two of the nodes in the network path, wherein, when receiving a network control message, each node appends data associated with at least one of the one or more performance characteristics to the network control message and forwards the network control message with the appended data to the client computer.

12. The non-transitory computer-readable medium of claim 11, wherein the object further displays data associated with a third respective performance characteristic of one or more of the plurality of network nodes in the network path via a third type of representation within the object.

13. A system comprising:
 a network that includes a plurality of network nodes;
 a server computer;
 a client computer coupled to the server computer via a network path; and
 a network management system coupled to the server computer and configured to:
  send a request to each of a plurality of network nodes in a network path for data associated with one or more performance characteristics, wherein at least one of the network nodes is configured to monitor the one or more performance characteristics, wherein the one or more performance characteristics include at least one of a CPU utilization rate, memory utilization rate, and number of dropped data packets;
  receive, from each of the plurality of network nodes in the network path, the requested data associated with the one or more performance characteristics, and
  generate an object within a graphical user interface (GUI) to:
   display, via a first type of representation within the object, data associated with a respective first performance characteristic of one or more of the plurality of network nodes in the network path, and
   display, via a second type of representation within the object, either data associated with a second respective performance characteristic of one or more of the plurality of network nodes in the network path or a characterization of the data associated with the respective first performance characteristic of one or more of the plurality of network nodes in the network path, the second type of representation being distinct from the first type of representation, wherein:
    the object comprises a graph having an x-axis associated with at least two of the network nodes; and a y-axis, associated with the respective first performance characteristic of the at least two of the network nodes,
    each of the at least two of the network nodes is being represented by a distinct position on the x-axis, and
    each respective first performance characteristic of each of the at least two of the network nodes is represented by a respective position on the y-axis.

14. The system of claim 13, wherein the first type of representation is a location of data points relative to the y-axis, and the second type of representation is a size of the data points.

15. The system of claim 13, wherein the first type of representation is a location of data points relative to the y-axis, and the second type of representation is a color of the data points.

16. The system of claim 13, wherein the object indicates that at least one network node in the network path is not configured to monitor performance characteristics of the at least one network node.

17. The system of claim 13, the network management system further configured to cause the server computer to transmit a network control message to a client computer via at least two of the nodes in the network path, wherein, when receiving a network control message, each node appends data associated with at least one of the one or more performance characteristics to the network control message and forwards the network control message with the appended data to the client computer.

* * * * *